(12) United States Patent  
Niergarth et al.

(10) Patent No.: US 12,345,165 B1  
(45) Date of Patent: Jul. 1, 2025

(54) GAS TURBINE ENGINE HAVING MULTIPLE STEAM TURBINES

(71) Applicant: General Electric Company, Schenectady, NY (US)

(72) Inventors: Daniel A. Niergarth, Norwood, OH (US); Brandon W. Miller, Middletown, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/591,643

(22) Filed: Feb. 29, 2024

(51) Int. Cl.
*F01D 13/00* (2006.01)
*F01D 15/12* (2006.01)
*F03D 13/00* (2016.01)

(52) U.S. Cl.
CPC ............. *F01D 15/12* (2013.01); *F03D 13/00* (2016.05); *F05D 2220/72* (2013.01); *F05D 2260/4023* (2013.01); *F05D 2260/4031* (2013.01)

(58) Field of Classification Search
CPC .......................... F01D 13/00; F05D 2220/272
See application file for complete search history.

(56) References Cited

U.S. PATENT DOCUMENTS

| | | | |
|---|---|---|---|
| 4,081,956 A | 4/1978 | Baker et al. | |
| 5,896,740 A | 4/1999 | Shouman | |
| 8,613,186 B2 | 12/2013 | Koganezawa et al. | |
| 9,677,430 B2 * | 6/2017 | Sackmann | F01K 17/025 |
| 10,054,045 B2 | 8/2018 | Dyrla et al. | |
| 10,087,838 B2 | 10/2018 | Moine et al. | |
| 10,704,810 B2 * | 7/2020 | Snell | F25B 31/002 |

(Continued)

FOREIGN PATENT DOCUMENTS

| | | |
|---|---|---|
| FR | 3127269 A1 | 3/2023 |
| FR | 3130896 A1 | 6/2023 |

(Continued)

OTHER PUBLICATIONS

Bjorn Fehrm, Leeham News and Analysis, "MTU gets support from Pratt & Whitney to develop the WET engine," published Nov. 29, 2022, available at https://leehamnews.com/2022/11/29/mtu-gets-support-from-pratt-whitney-to-develop-the-wet-engine/, as viewed on Jun. 30, 2023.

(Continued)

*Primary Examiner* — Courtney D Heinle
*Assistant Examiner* — Danielle M. Christensen
(74) *Attorney, Agent, or Firm* — Venable LLP; Edward A. Kmett; Michele V. Frank

(57) ABSTRACT

A gas turbine engine includes a steam generating system and a turbo-engine. The turbo-engine includes a first spool having a fan and a low-pressure turbine drivingly connected together, a second spool having an intermediate-pressure compressor and an intermediate-pressure turbine drivingly connected together, and a third spool having a high-pressure compressor and a high-pressure turbine drivingly connected together. The turbo-engine also includes a first steam turbine arranged to receive a flow of steam from the steam generating system, and arranged to be connected to, and to drive the first spool, and a second steam turbine arranged to receive a flow of steam from the steam generating system, and arranged to be connected to, and to drive one of the second spool or the third spool.

20 Claims, 7 Drawing Sheets

(56) References Cited

U.S. PATENT DOCUMENTS

| | | |
|---|---|---|
| 11,459,948 B2 | 10/2022 | Uechi et al. |
| 11,603,798 B1 | 3/2023 | Terwilliger et al. |
| 12,215,634 B1 * | 2/2025 | Sibbach .................... F02C 9/16 |
| 2010/0223904 A1 * | 9/2010 | Edwards ................ F02C 3/113 60/224 |
| 2023/0011956 A1 | 1/2023 | Wiedenhoefer et al. |
| 2023/0072621 A1 | 3/2023 | Swann et al. |
| 2025/0052190 A1 * | 2/2025 | Sibbach .................... F02C 3/30 |

FOREIGN PATENT DOCUMENTS

| | | | |
|---|---|---|---|
| FR | 3130897 | A1 | 6/2023 |
| FR | 3133367 | A1 | 9/2023 |
| FR | 3133368 | A1 | 9/2023 |

OTHER PUBLICATIONS

MTU Aero Engines, "Water-enhanced turbofan," available at https://www.mtu.de/technologies/clean-air-engine/water-enhanced-turbofan/, as viewed on Jun. 30, 2023.

Isabel Henrich, MTU Aero Engines, "A brief guide: How the WET concept works," published Jun. 2022, available at https://aeroreport.de/en/good-to-know/a-brief-guide-how-the-wet-concept-works, as viewed on Jun. 30, 2023.

Slides from Sustainable Water-Injecting Turbofan Comprising Hybrid-Electrics (SWITCH) Introduction at the 2023 NPSS Annual Consortium Meeting, Mar. 10, 2023.

* cited by examiner

ID HAVING MULTIPLE STEAM TURBINES

GAS TURBINE ENGINE HAVING MULTIPLE STEAM TURBINES

TECHNICAL FIELD

The present disclosure relates to a gas turbine engine that has multiple steam turbines.

BACKGROUND

Turbine engines, for example, for aircraft, generally include a fan and a core section (or turbo-engine). The turbo-engine generally includes a compressor section, a combustion section, and a turbine section that are in serial flow relationship with one another, and the turbo-engine generally drives the fan, which provides propulsive thrust.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
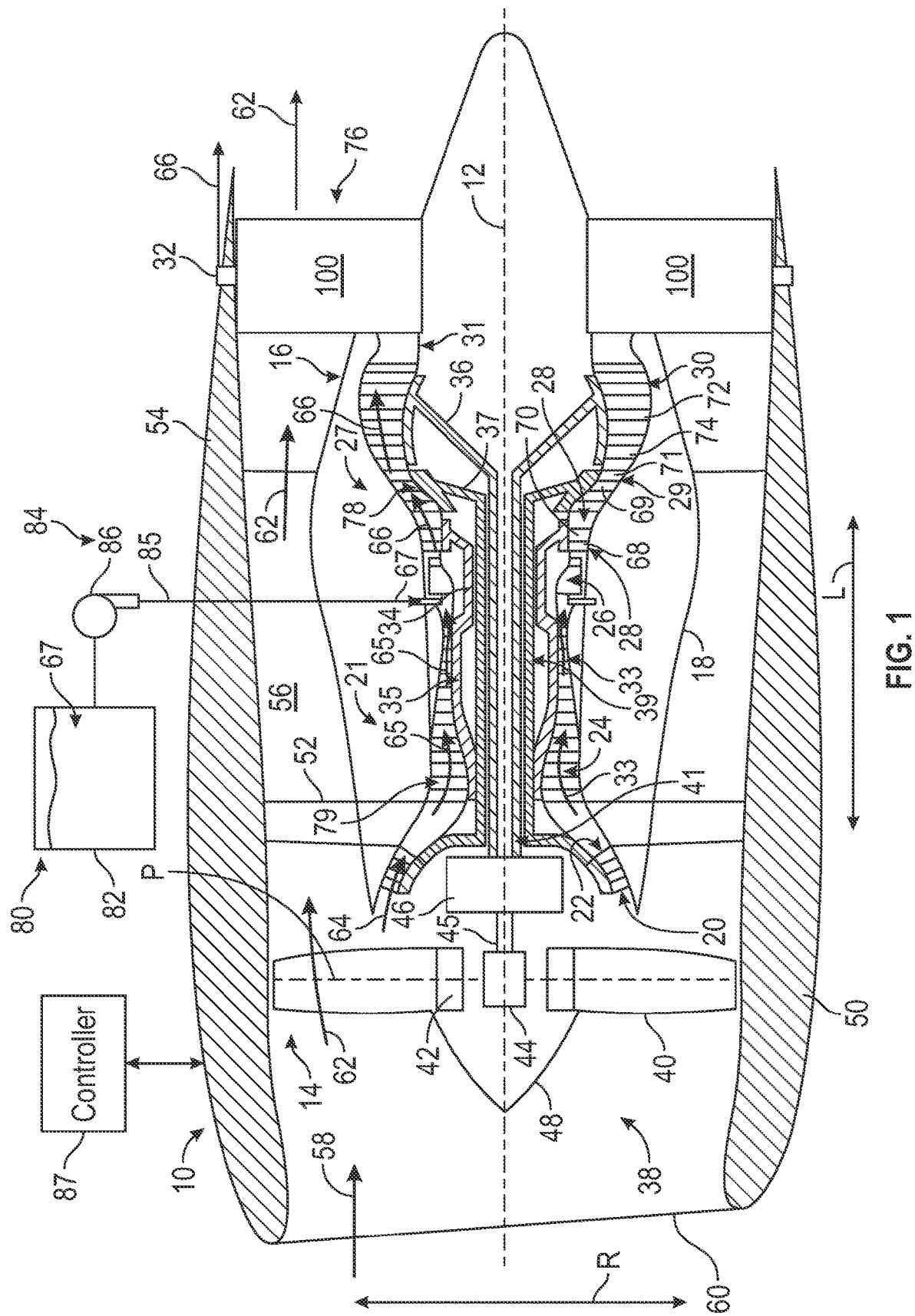
FIG. 1 is a schematic partial cross-sectional side view of an exemplary high by-pass turbofan jet engine and a steam generating system, according to an aspect of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the scope of the present disclosure.

As used herein, the terms "first" or "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the aircraft gas turbine engine. Moreover, the terms "radial" and "radially" refer to directions and orientations that extend substantially perpendicular to the centerline of the aircraft gas turbine engine. In addition, as used herein, the terms "circumferential" and "circumferentially" refer to directions and orientations that extend arcuately about the centerline of the turbine engine.

Turbine engines, for example, for aircraft, generally include a fan and a core section (or a turbo-engine). The turbo-engine generally includes a compressor section, a combustion section, and a turbine section that are in serial flow relationship with one another, and the turbo-engine generally drives the fan, which provides propulsive thrust. In some operating states of the turbine engine, such as in a high power operating state during takeoff or climb-out of an aircraft, thrust augmentation may be desired to increase the thrust of the turbine engine.

The present disclosure provides a technique to augment the thrust of the turbine engine by incorporating a steam generating system and multiple steam turbines. According to the present disclosure, the turbo-engine includes three spools: a low-pressure spool (e.g., a low-pressure turbine that drives the fan), an intermediate-pressure spool (e.g., an intermediate-pressure compressor and an intermediate-pressure turbine), and a high-pressure spool (e.g., a high-pressure compressor and a high-pressure turbine). The turbo-engine also includes a first steam turbine that is connected to the low-pressure spool of the turbo-engine so as to provide additional power to the low-pressure spool, and to the fan, when thrust augmentation is desired. The turbo-engine of the present disclosure also includes a second steam turbine that is connected to, and that drives, either the intermediate-pressure spool or the high-pressure spool. The second steam turbine, therefore, can provide additional power within the turbo-engine to help drive either the intermediate-pressure spool or the high-pressure spool. As a result, thrust augmentation can be provided via the multiple steam turbines.

Referring now to the drawings, FIG. 1 is a schematic cross-sectional diagram of an aircraft gas turbine engine 10 that may be installed on an aircraft (not shown) and that includes a steam generating system 100 (described below), taken along a longitudinal centerline axis 12 (provided for reference) of the aircraft gas turbine engine 10, according to an embodiment of the present disclosure. The present disclosure may be implemented in any of various types of aircraft turbine engines, including high bypass turbofan engines, turbojet engines, and turboprop engines. As shown in FIG. 1, the aircraft gas turbine engine 10 has a longitudinal direction L (extending parallel to the longitudinal centerline axis 12) and a radial direction R that is normal to the longitudinal direction L. In general, the aircraft gas turbine engine 10 includes a fan section 14 and a turbo-engine 16 disposed downstream from the fan section 14.

The turbo-engine 16 includes an outer casing 18 that is substantially tubular and defines an annular inlet 20. As schematically shown in FIG. 1, the outer casing 18 encases, in serial flow relationship, a compressor section 21 including a booster or an intermediate-pressure compressor (IPC) 22, followed downstream by a high-pressure compressor (HPC) 24, a combustor 26, a turbine section 27 including a high-pressure turbine (HPT) 28 followed downstream by an intermediate-pressure turbine (IPT) 29, and a low-pressure turbine (LPT) 30, and an exhaust section 31 that includes one or more core exhaust nozzles 32. The compressor section 21, the combustor 26, the turbine section 27, and the exhaust section 31, including the one or more core exhaust nozzles 32, together define a turbo-engine air flow path 33 therethrough. A high-pressure (HP) shaft 34 drivingly connects the HPT 28 to the HPC 24 to define a high-pressure spool 35 such that the HPC 24 and the HPT 28 rotate in unison. An intermediate-pressure (IP) shaft 37 drivingly connects the IPC 22 and the IPT 29 to define an intermediate-pressure spool 39 such that the IPC 22 and the IPT 29 rotate in unison. A low-pressure (LP) shaft 36 drivingly connects the LPT 30 to a fan 38 (described below) via a gearbox assembly 46 so as to define a low-pressure spool 41, and the LPT 30 and the fan 38 rotate in unison.

As shown in FIG. 1, the fan section 14 includes the fan 38 having a plurality of fan blades 40 that are coupled to a disk 42 in a circumferentially spaced-apart manner. As depicted in FIG. 1, the fan blades 40 extend outwardly from the disk 42 generally along a radial direction R. The fan 38 may be a variable pitch fan in which each fan blade 40 is rotatable relative to the disk 42 about a pitch axis P. The fan blades 40 are operatively coupled to an actuator 44 that is configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across the gearbox assembly 46. The gearbox assembly 46 is shown schematically in FIG. 1, but generally includes a plurality of gears (not shown) for adjusting the rotational speed of the fan shaft 45 and, thus, adjusting the rotational speed of the fan 38 relative to the LP shaft 36.

Referring still to the exemplary embodiment of FIG. 1, the disk 42 is covered by a rotatable fan hub 48 that is aerodynamically contoured to promote an airflow through the plurality of fan blades 40. In addition, the fan section 14 includes an annular fan casing or a nacelle 50 that circumferentially surrounds the fan 38 and/or at least a portion of the turbo-engine 16. The nacelle 50 is supported relative to the turbo-engine 16 by a plurality of circumferentially spaced struts or outlet guide vanes 52. A downstream section 54 of the nacelle 50 extends over an outer portion of the turbo-engine 16 to define a bypass airflow passage 56 therebetween. The one or more core exhaust nozzles 32 may extend through the nacelle 50 and be formed therein. The one or more core exhaust nozzles 32 include one or more discrete nozzles that are spaced circumferentially about the nacelle 50. Other arrangements of the one or more core exhaust nozzles 32 may be used instead, including, for example, a single core exhaust nozzle that is annular, or partially annular, about the nacelle 50.

During a standard operating mode of the aircraft gas turbine engine 10, a volume of air 58 enters the aircraft gas turbine engine 10 through an inlet 60 of the nacelle 50 and/or the fan section 14. As the volume of air 58 passes across the fan blades 40, a first portion of air 58, shown as bypass air 62, is directed or routed into the bypass airflow passage 56, and a second portion of the air 58, shown as core air 64, is directed or is routed into the upstream section of the turbo-engine air flow path 33, or, more specifically, into the annular inlet 20 of the IPC 22. A ratio between the bypass air 62 and the core air 64 is known as a bypass ratio. The pressure of the core air 64 is then increased by the IPC 22, generating compressed air 65, and the compressed air 65 is routed through the HPC 24, where it is further compressed before being directed into the combustor 26. In the combustor 26, the compressed air 65 is mixed with fuel 67 and burned to generate combustion gases 66 (also referred to as combustion products). One or more stages may be used in each of the IPC 22 and the HPC 24, with each subsequent stage further compressing the compressed air 65.

The combustion gases 66 are routed from the combustor 26 into the HPT 28 and expanded through the HPT 28. In the HPT 28, a portion of thermal energy and/or kinetic energy from the combustion gases 66 is extracted via sequential stages of HPT stator vanes 68 that are coupled to the outer casing 18, and HPT rotor blades 70 that are coupled to rotors connected to the HP shaft 34, thus, causing the HP shaft 34 to rotate, which supports operation of the HPC 24. The combustion gases 66 are then routed into the IPT 29 and are further expanded through the IPT 29. Here, a second portion of the thermal energy and/or the kinetic energy is extracted from the combustion gases 66 via sequential stages of IPT stator vanes 69 that are coupled to the outer casing 18, and IPT rotor blades 71 that are coupled to IPT rotors connected to the IP shaft 37, thus, causing the IP shaft 37 to rotate, which supports operation of the IPC 22. The combustion gases 66 are then routed into the LPT 30 and are further expanded through the LPT 30. Here, a third portion of the thermal energy and/or the kinetic energy is extracted from the combustion gases 66 via sequential stages of LPT stator vanes 72 that are coupled to the outer casing 18, and LPT rotor blades 74 that are coupled to LPT rotors connected to the LP shaft 36, thus, causing the LP shaft 36 to rotate, which supports operation of, and rotation of, the fan 38 via the gearbox assembly 46. One or more stages may be used in each of the HPT 28, the IPT 29, and the LPT 30. The combustion gases 66 are subsequently routed through the one or more core exhaust nozzles 32 of the turbo-engine 16 to provide propulsive thrust.

Simultaneously with the flow of the core air 64 through the turbo-engine air flow path 33, the bypass air 62 is routed through the bypass airflow passage 56 before being exhausted from a fan bypass nozzle 76 of the aircraft gas turbine engine 10, also providing propulsive thrust. The HPT 28, IPT 29, the LPT 30, and the one or more core exhaust nozzles 32 at least partially define a hot gas path 78 for routing the combustion gases 66 through the turbo-engine 16. Together, the turbo-engine air flow path 33 and the hot gas path 78 define a turbo-engine flow path 79.

As noted above, the compressed air 65 is mixed with the fuel 67 in the combustor 26, and forms a fuel and air mixture that is combusted, generating the combustion gases 66 (combustion products). The fuel 67 can include any type of hydrocarbon fuel used for turbine engines, such as, for example, sustainable aviation fuels (SAF) including biofuels, Jet A, Jet A-1, or other hydrocarbon fuels. Other fuel types, which may or may not be hydrocarbon fuels, but that may generally be used in an aircraft gas turbine engine may also be utilized to implement the present disclosure. The aircraft gas turbine engine 10 also includes a fuel system 80 for providing the fuel 67 to the combustor 26. The fuel system 80 includes a fuel tank 82 for storing the fuel 67 therein, and a fuel delivery assembly 84. The fuel tank 82 can be located on any one or more locations (e.g., within a wing or within a fuselage) on the aircraft (not shown) to which the aircraft gas turbine engine 10 is attached. While a single fuel tank 82 is shown in FIG. 1, the fuel system 80 can include any number of fuel tanks 82, as desired. The fuel delivery assembly 84 delivers the fuel 67 from the fuel tank 82 to the combustor 26 via one or more fuel supply lines 85. The fuel delivery assembly 84 also includes a fuel pump 86 to induce the flow of the fuel 67 through the fuel supply lines 85 to the combustor 26. In this way, the fuel pump 86 pumps the fuel 67 from the fuel tank 82, through the fuel supply lines 85, and into the combustor 26.

Operation of the gas turbine engine 10 may be controlled in whole or in part by an electronic engine controller, shown schematically at controller 87. One example of such a controller 87 is a full authority digital engine controller ("FADEC"). The controller 87 may be mounted in any convenient location on the aircraft (not shown) or in the gas turbine engine 10, including, but not limited to, within the nacelle 50, or within the turbo-engine 16.

The aircraft gas turbine engine 10 of the present disclosure includes the steam generating system 100, which, as will be described in more detail below, is in fluid communication with the one or more core exhaust nozzles 32 and the fan bypass nozzle 76. As will be described in more detail below, the steam generating system 100 generates steam utilizing the combustion gases 66 as the combustion gases 66 flow through the steam generating system 100, and may deliver at least a portion of the generated steam to the combustor 26.

The aircraft gas turbine engine 10 depicted in FIG. 1 is by way of example only. In other exemplary embodiments, the aircraft gas turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable aircraft gas turbine engine, such as, for example, turbofan engines, propfan engines, and/or turboprop engines.

Figure 2:
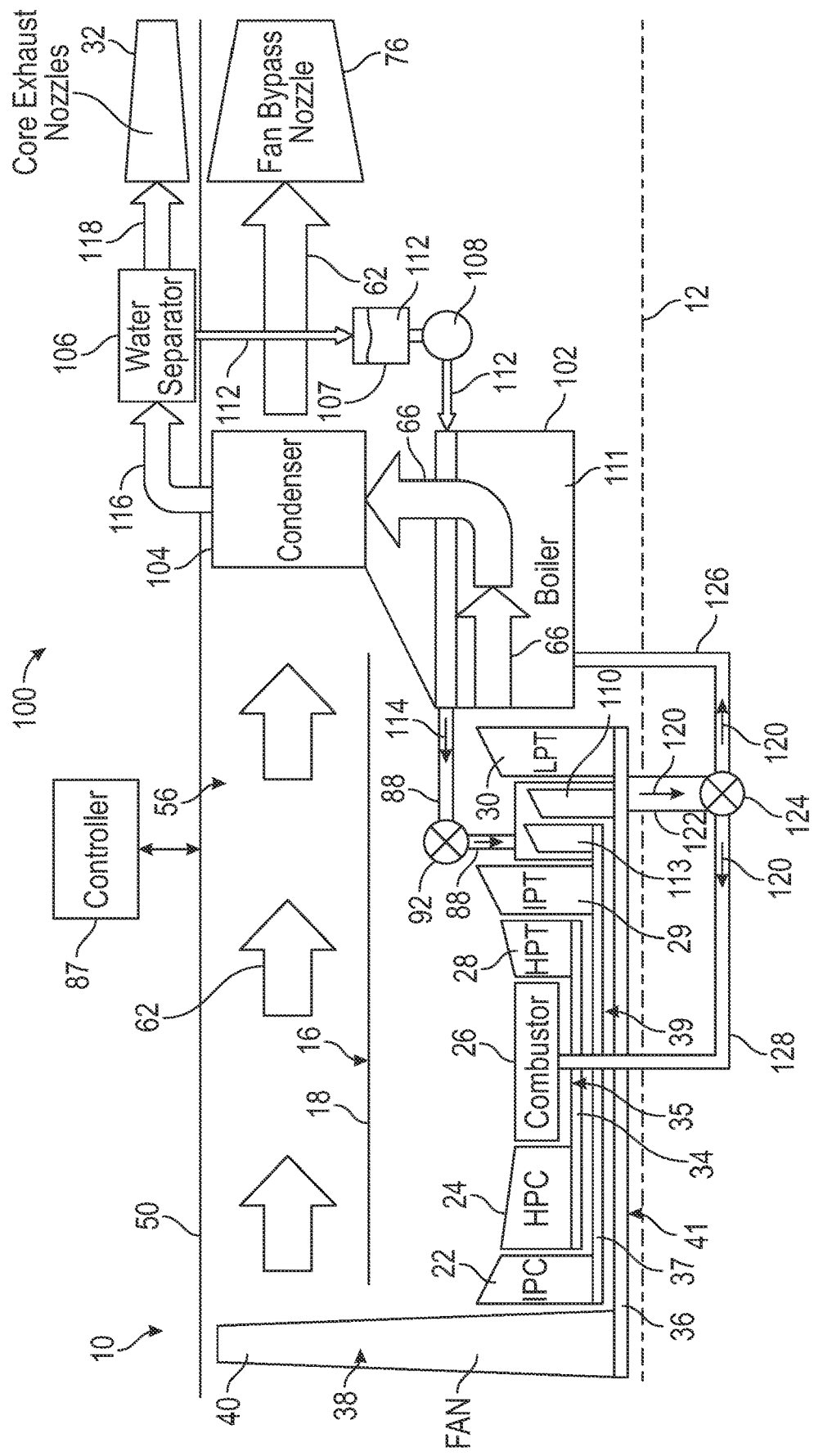
FIG. 2 is a schematic diagram of the high by-pass turbofan jet engine and the steam generating system of FIG. 1, according to an aspect of the present disclosure.

FIG. 2 is a schematic diagram of the aircraft gas turbine engine 10 and the steam generating system 100 of FIG. 1, according to an aspect of the present disclosure. For clarity, the aircraft gas turbine engine 10 is shown schematically in FIG. 2 and some components depicted and described above with regard to FIG. 1 are not shown in FIG. 2. As shown in FIG. 2, the steam generating system 100 includes a boiler 102, a condenser 104, a water-exhaust separator 106, a water pump 108, a first steam turbine 110, and a second steam turbine 113.

The boiler 102 is a heat exchanger that vaporizes liquid water from a water source to generate steam or water vapor. The boiler 102 is thus a steam source. In particular, the boiler 102 is an exhaust gas-water heat exchanger in which the boiler 102 is in fluid communication with the hot gas path 78 (FIG. 1) and is positioned downstream of the LPT 30 so that the combustion gases 66 provide heat to the boiler 102 to boil water 111 contained within the boiler 102. The boiler 102 is also in fluid communication with the water pump 108 to replenish water within the boiler 102. The boiler 102 can include any type of boiler or heat exchanger for extracting heat from the combustion gases 66 and vaporizing liquid water into steam or water vapor as the liquid water and the combustion gases 66 flow through the boiler 102.

The condenser 104 is located downstream of the boiler 102 and is a heat exchanger that further cools the combustion gases 66 as the combustion gases 66 flow from the boiler 102 through the condenser 104. In particular, the condenser 104 is an air-exhaust gas heat exchanger that is in fluid communication with the boiler 102, and is positioned within the bypass airflow passage 56. The condenser 104 can include any type of condenser for condensing water from the exhaust (e.g., the combustion gases 66).

The water-exhaust separator 106 is located downstream of the condenser 104 and is in fluid communication with the condenser 104 for receiving, from the condenser 104, cooled exhaust (combustion gases 66) having condensed water entrained therein. The water-exhaust separator 106 is also in fluid communication with the one or more core exhaust nozzles 32 to provide separated exhaust gases thereto. The water-exhaust separator 106 is also in fluid communication with a water storage tank 107 to provide separated water 112 to the water storage tank 107. The water-exhaust separator 106 includes any type of water separator for separating water from the exhaust. For example, the water-exhaust separator 106 can include a cyclonic separator that uses vortex separation to separate the water from the exhaust. In such embodiments, the water-exhaust separator 106 generates a cyclonic flow within the water-exhaust separator 106 to separate the water from the cooled exhaust. In FIG. 2, the water-exhaust separator 106 is schematically depicted as being within the nacelle 50, but the water-exhaust separator 106 could be located at other locations within the aircraft gas turbine engine 10, such as, for example, radially inward of the nacelle 50, closer to the turbo-engine 16. The water-exhaust separator 106 may be driven to rotate by one of the engine shafts, such as the HP shaft 34, the IP shaft 37, or the LP shaft 36, via, for example, an accessory gearbox (not shown).

As noted above, the boiler 102 receives the water 111 from a water source to generate steam 114. The water source may be the water storage tank 107 that is provided between the water-exhaust separator 106 and the water pump 108. The water pump 108 is in fluid communication with the water storage tank 107 and with the boiler 102. The water pump 108 may be any suitable pump, such as a centrifugal pump or a positive displacement pump. The water pump 108 directs the separated water 112 that is stored in the water storage tank 107 to the boiler 102, where it is stored as the water 111 that is then converted to the steam 114. The steam 114 is sent through a steam supply line 88 to flow through the first steam turbine 110 and to flow through the second steam turbine 113 to provide work to drive the first steam turbine 110 and to provide work to drive the second steam turbine 113. As shown in FIG. 2, the first steam turbine 110 is connected to the LP shaft 36, which provides a driving force to the LP spool 41. The second steam turbine 113 is connected to the IP shaft 37, which provides a driving force to the IP spool 39.

In the FIG. 2 embodiment, the second steam turbine 113 and the first steam turbine 110 are arranged in serial flow relationship, with the first steam turbine 110 being arranged downstream of the second steam turbine 113. The second steam turbine 113 and the first steam turbine 110 are, therefore, in fluid communication with each other. The first steam turbine 110 and the second steam turbine 113 are also configured to receive the flow of the steam 114 from the steam supply line 88 outside of the turbo-engine air flow path 33 (FIG. 1) of the turbo-engine 16. That is, as was described above, the turbo-engine air flow path 33 provides the flow of the compressed air 65 through the compressor section 21 to the combustor 26, and, then, the combustion gases 66 flow through the hot gas path 78 from the combustor 26 through the turbine section 27, and, then, through the core exhaust nozzles 32. The first steam turbine 110 and the second steam turbine 113, on the other hand, are arranged outside of the turbo-engine air flow path 33 and the hot gas path 78 so that first steam turbine 110 and the second steam turbine 113 do not interact with, and are not driven by the combustion gases 66, but are driven by the steam 114 provided from the boiler 102.

After the steam 114 is provided to the first steam turbine 110 and to the second steam turbine 113, a remaining amount of the steam 114, shown schematically as steam 120, is provided through a steam supply line 122 to a steam supply control valve 124. The controller 87 controls the steam supply control valve 124 to either return the steam 120 to the boiler 102 via a steam supply line 126, or to provide the steam 120 to the combustor 26 via a steam supply line 128. In the combustor 26, the steam 120 can be mixed with the combustion gases 66 to increase the mass (i.e., the density) of the combustion gases 66 so as to aid in the augmentation of the power of the gas turbine engine 10. The steam 120 mixed with the combustion gases 66 can then be extracted by the condenser 104 and the water-exhaust separator 106 as the water 112 to be returned to the water storage tank 107.

Figure 3:
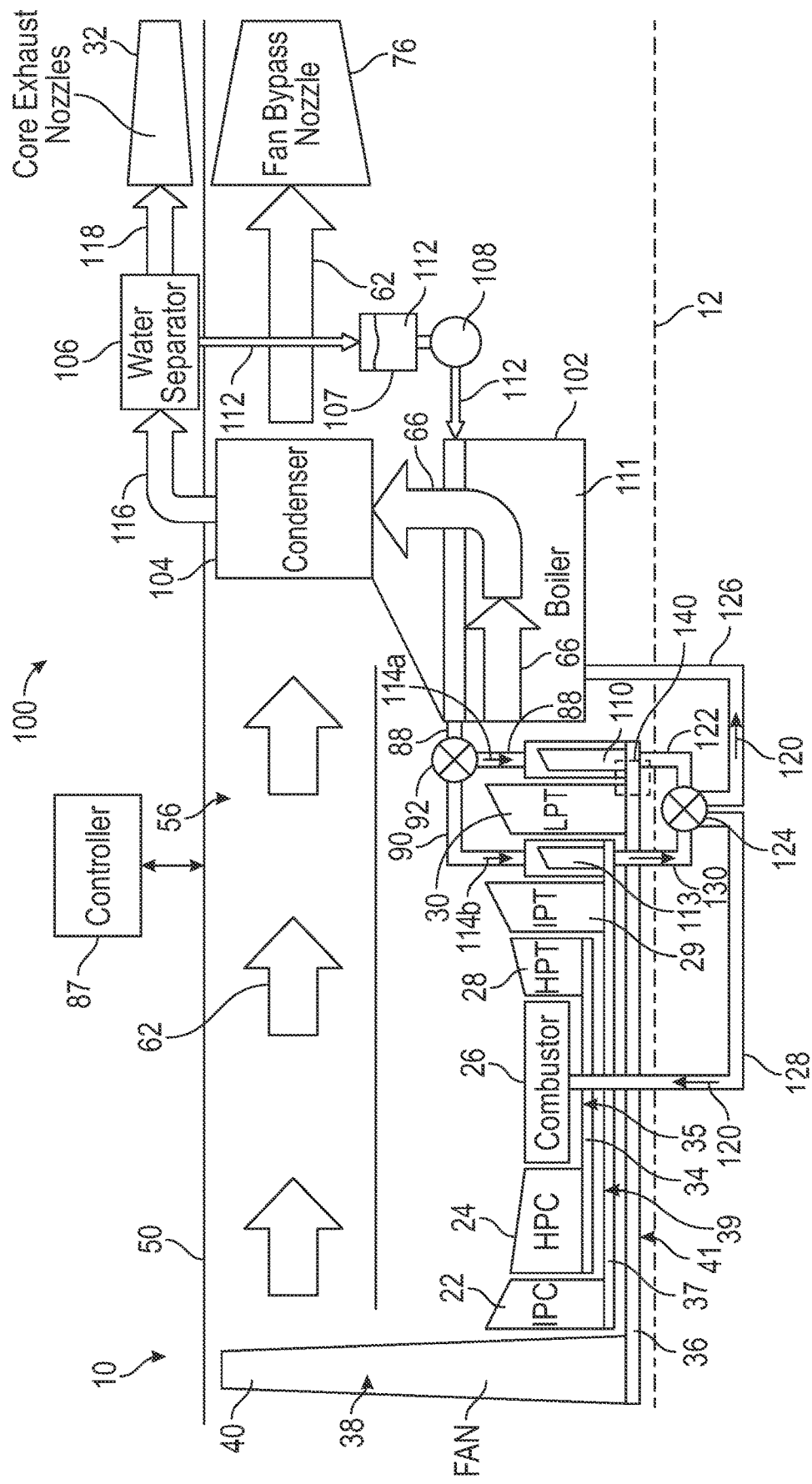
FIG. 3 is a schematic diagram of the aircraft gas turbine engine and the steam generating system of FIG. 1, according to another aspect of the present disclosure.

FIG. 3 is a schematic diagram of the aircraft gas turbine engine 10 and the steam generating system 100 of FIG. 1, according to another aspect of the present disclosure. In FIG. 3, elements that are the same as those shown and described above for FIG. 2 include the same reference numbers and the description thereof provided above is equally applicable to FIG. 3 and is not described again herein. In the FIG. 3 embodiment, the first steam turbine 110 and the second steam turbine 113 are not arranged in fluid communication with each other so as to receive the same flow of the steam 114, but, rather, are arranged separately to receive a respective separate flow of the steam 114. As with the FIG. 2 embodiment, the first steam turbine 110 is connected to the low-pressure shaft 36 so as to provide additional power to drive the low-pressure spool 41, and the second steam turbine 113 is connected to the intermediate-pressure shaft 37 so as to provide additional power to drive the intermediate-pressure spool 39. The steam supply control valve 92, however, is controlled by the controller 87: (1) to provide a first flow of steam 114a to the first steam turbine 110 via the steam supply line 88, (2) to provide a second flow of steam 114b to the second steam turbine 113 via a steam supply line 90, or (3) to provide the first flow of the steam 114 to the first steam turbine 110 via the steam supply line 88 and to provide the second flow of the steam 114b to the second steam turbine 113 via the steam supply line 90. As a result, the additional power can be provided to either the low-pressure spool 41, to the intermediate-pressure spool 39, or simultaneously to both the low-pressure spool 41 and to the intermediate-pressure spool 39. Therefore, the additional power can be controlled to be provided to different spools as needed during high power operations of the gas turbine engine 10.

Similar to the FIG. 2 embodiment, the remaining steam, denoted as the remaining steam 120, can be provided from the first steam turbine 110 to the steam supply control valve 124 via the steam supply line 88. The remaining steam 120 from the second steam turbine 113 can also be provided to the steam supply control valve 124 via a steam supply line 130. As with the FIG. 2 aspect, the steam supply control valve 124 is controlled by the controller 87 to provide the remaining steam 120 either back to the boiler 102 via the steam supply line 126, or to the combustor 26 via the steam supply line 128.

Figure 4:
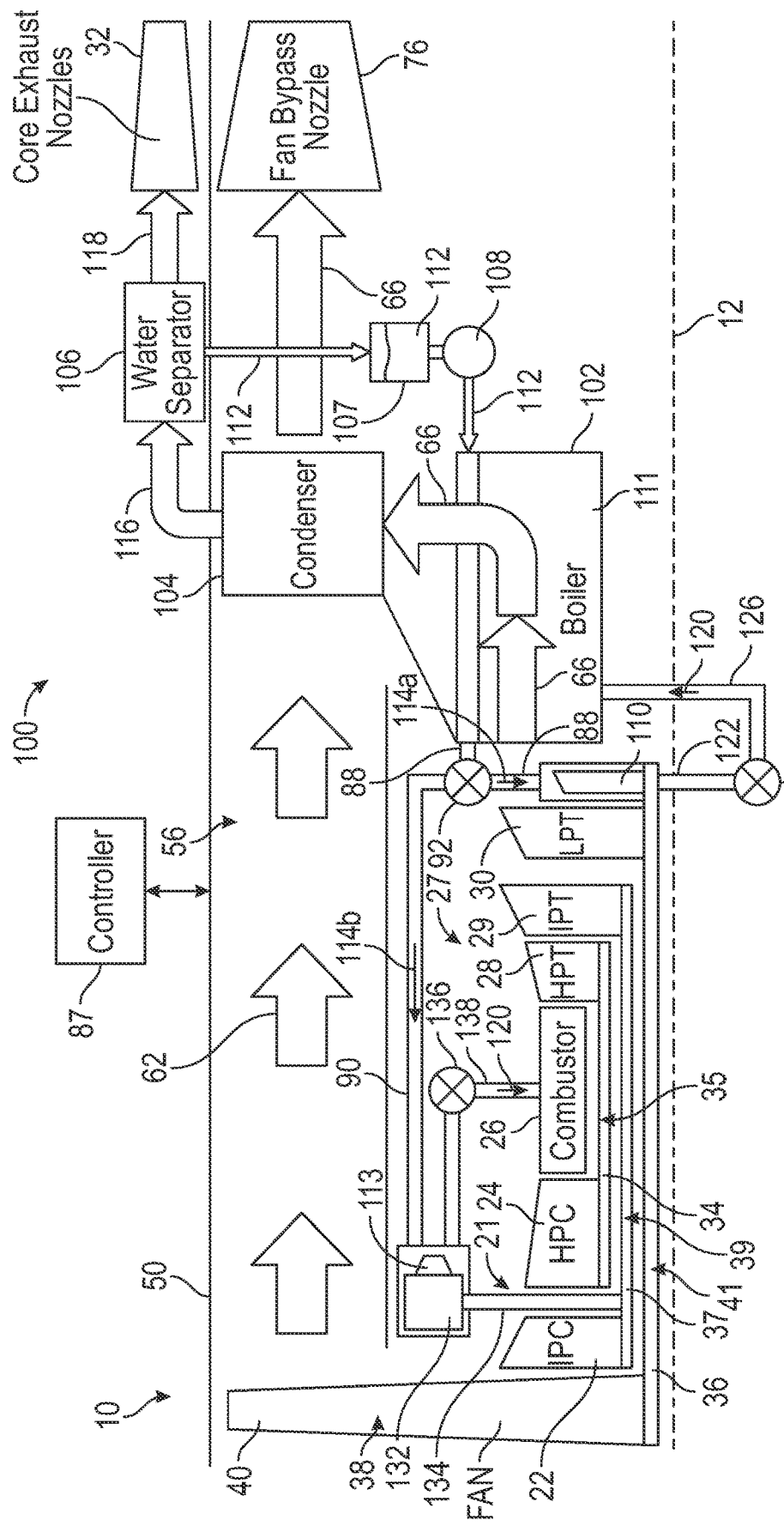
FIG. 4 is a schematic diagram of the aircraft gas turbine engine and the steam generating system of FIG. 1, according to another aspect of the present disclosure.

FIG. 4 is a schematic diagram of the aircraft gas turbine engine 10 and the steam generating system 100 of FIG. 1, according to another aspect of the present disclosure. In FIG. 4, elements that are the same as those shown and described above for FIG. 3 include the same reference numbers and the description thereof provided above is equally applicable to FIG. 4 and is not described again herein. In the embodiment of FIG. 4 the first steam turbine 110 is connected to the low-pressure shaft 36 and receives the first flow of the steam 114a from the steam supply control valve 92 in the same manner described above for FIG. 3. In the embodiment of FIG. 4, the second steam turbine 113 is arranged to drive the intermediate-pressure shaft 37, but, in contrast to the embodiment of FIG. 3, is not directly connected to the intermediate-pressure shaft 37. Rather, the second steam turbine 113 is connected to a gearbox 132 to drive the gearbox 132. The gearbox 132 is connected to drive the intermediate-pressure spool 39 by being connected to the intermediate-pressure shaft 37 via a driveshaft 134 at the intermediate-pressure compressor 22. The second flow of the steam 114b is provided to the second steam turbine 113 via the steam supply line 90, and, similar to embodiment of FIG. 3, the steam supply control valve 92 controls the second flow of the steam 114b to the second steam turbine 113. The remaining steam 120 from the second steam turbine 113 is then controlled, via a steam supply control valve 136 and a steam supply line 138, to be provided back to the combustor 26 so as to mix with the combustion gases 66. Thus, similar to the embodiment of FIG. 3, the additional power provided to the low-pressure spool 41 via the first steam turbine 110, and the additional power provided to the intermediate-pressure spool 39 via the second steam turbine 113, can be controlled separately.

While FIG. 4 depicts the second steam turbine 113, the gearbox 132, and the driveshaft 134 being arranged adjacent to the compressor section 21 of the turbo-engine 16, and being connected to the intermediate-pressure spool 39 at the intermediate-compressor 22, the second steam turbine 113, the gearbox 132, and the driveshaft 134 may instead be arranged adjacent to the turbine section 27 of the turbo-engine 16 such that the driveshaft 134 is connected to the intermediate-pressure shaft 37 at the intermediate-pressure turbine 29. In the same manner as described above, second steam turbine 113 is driven by the second flow of the steam 114b to drive the gearbox 132, and the driveshaft 134 drives the intermediate pressure spool 39.

Figure 5:
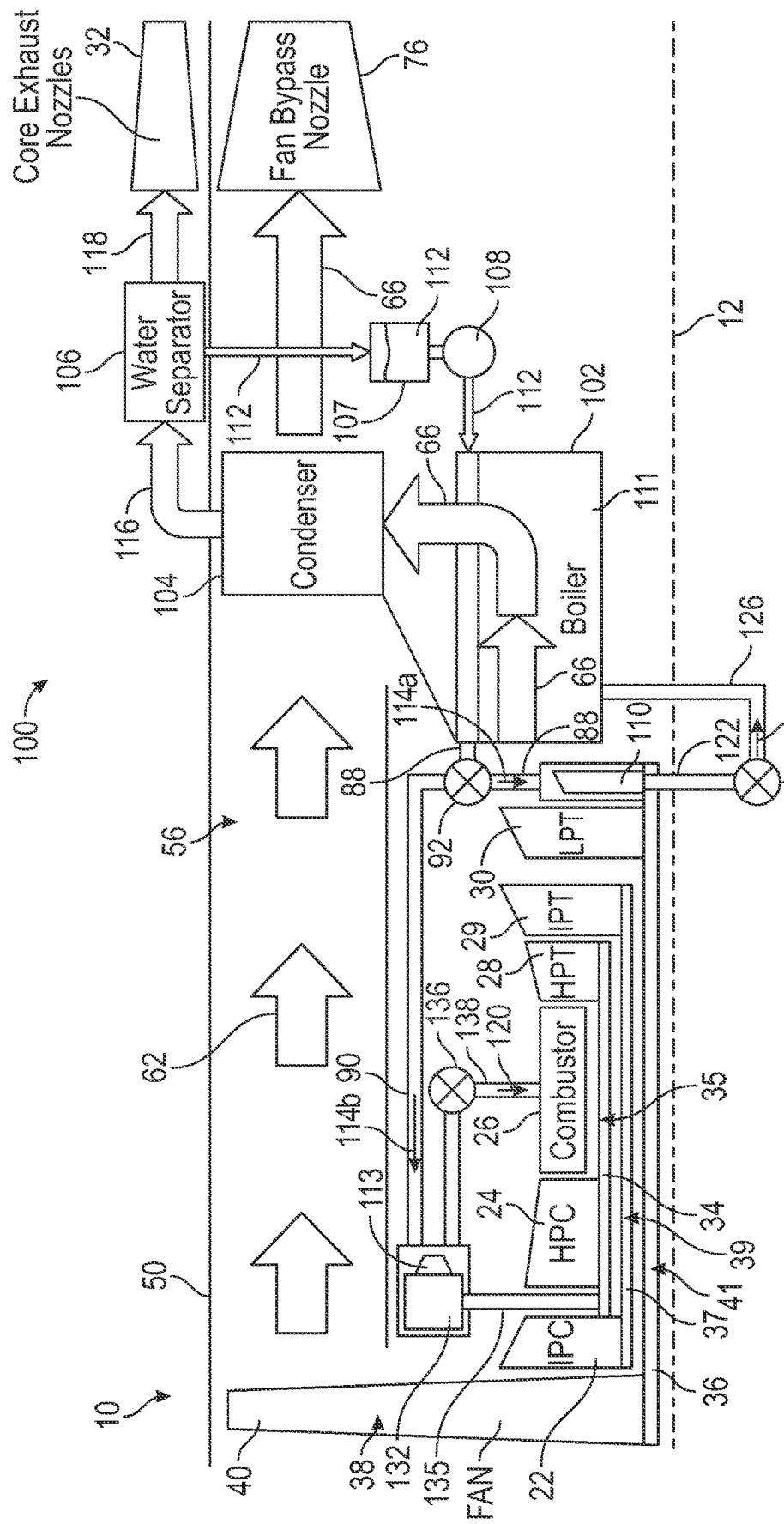
FIG. 5 is a schematic diagram of the aircraft gas turbine engine and the steam generating system of FIG. 1, according to another aspect of the present disclosure.

FIG. 5 is a schematic diagram of the aircraft gas turbine engine 10 and the steam generating system 100 of FIG. 1, according to another aspect of the present disclosure. In FIG.

5, elements that are the same as those shown and described above for FIG. 4 include the same reference numbers and the description thereof provided above is equally applicable to FIG. 5 and is not described again herein. In the embodiment of FIG. 5, the first steam turbine 110 is connected to the low-pressure shaft 36 and receives the first flow of the steam 114a from the steam supply control valve 92 in the same manner described above for the FIG. 3 and the FIG. 4 aspect. In the FIG. 5 embodiment, in contrast to the FIG. 4 embodiment, the second steam turbine 113 is arranged to drive the high-pressure spool 35 rather than being arranged to drive the intermediate-pressure spool 39. Similar to the FIG. 4 embodiment, in the FIG. 5 embodiment the second steam turbine 113 is connected to the gearbox 132 to drive the gearbox 132, but the gearbox 132 is connected to the high-pressure shaft 34 via a driveshaft 135 rather than the driveshaft 134 being connected to the intermediate-pressure shaft 37. The second flow of the steam 114b is provided to the second steam turbine 113 via the steam supply line 90, and, in the same manner as in the FIG. 4 aspect, the steam supply control valve 92 controls the second flow of the steam 114b/to the second steam turbine 113. The remaining steam 120 from the second steam turbine 113 is then controlled, via the steam supply control valve 136 and the steam supply line 138, to be provided back to the combustor 26 so as to mix with the combustion gases 66. Thus, the additional power provided to the low-pressure spool 41 via the first steam turbine 110, and the additional power provided to the high-pressure spool 35 via the second steam turbine 113, can be controlled separately.

Figure 6:
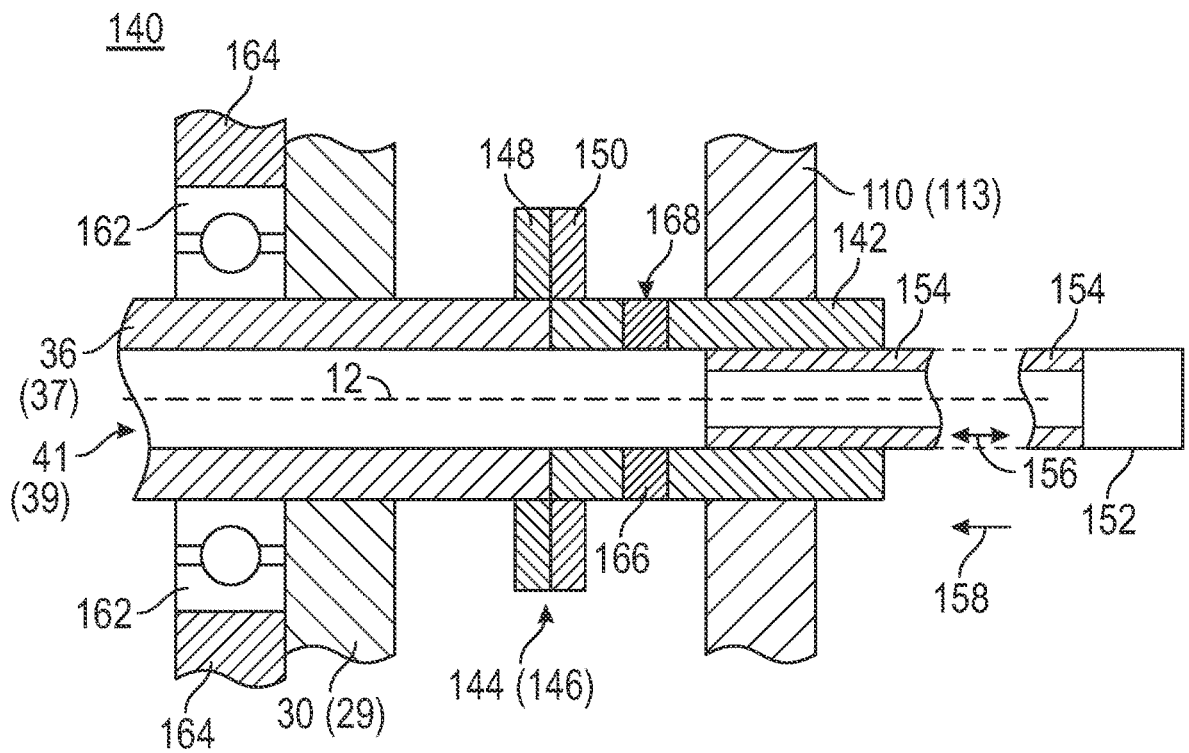
FIG. 6 is an enlarged, cross-sectional, detail view of a connection between a low-pressure spool and the first steam turbine, taken at detail view 140 of FIG. 3, according to an aspect of the present disclosure.

FIG. 6 is an enlarged, cross-sectional, detail view of a connection between the low-pressure spool 41 and the first steam turbine 110, taken at detail view 140 of FIG. 3, according to an aspect of the present disclosure. As shown in FIG. 6, the first steam turbine 110 may be connected to a steam turbine shaft 142 that is separate from the low-pressure shaft 36. The low-pressure shaft 36 is mounted to a frame 164 (shown generally) within the gas turbine engine 10 via bearings 162 so as to allow the low-pressure shaft 36 to rotate about the longitudinal centerline axis 12, but to limit axial movement of the low-pressure shaft 36 in an axial direction along the longitudinal centerline axis 12. The low-pressure shaft 36 and the steam turbine shaft 142 are joined together, during operation of the first steam turbine 110, via a coupling device 144, which may be a clutch device 146 having a first clutch plate 148 connected to the low-pressure shaft 36, and a second clutch plate 150 connected to the steam turbine shaft 142. The steam turbine shaft 142 is connected to an actuator 152 that has an actuator shaft 154 that is connected to the steam turbine shaft 142. The actuator shaft 154 and the steam turbine shaft 142 may be connected together so that the actuator shaft 154 and the steam turbine shaft 143 rotate in unison, and also translate in an axial direction (i.e., translate axially along the longitudinal centerline axis 12) in unison. That is, the actuator 152 can actuate the actuator shaft 154 and the steam turbine shaft 142 to translate in unison in an axial direction 156 (i.e., longitudinally along the longitudinal centerline axis 12). In FIG. 6, the actuator 152, during operation of the first steam turbine 110, actuates the actuator shaft 154 in a first axial direction 158 to engage the second clutch plate 150 connected to the steam turbine shaft 142 with the first clutch plate 148 that is connected to the low-pressure shaft 36, which connects the first steam turbine 110 to the low-pressure spool 41 (FIG. 3). As a result, the first steam turbine 110, while being provided with the steam 114 or the first flow of the steam 114a as described above, can provide additional power to drive the low-pressure spool 41 (FIG. 3).

Figure 7:
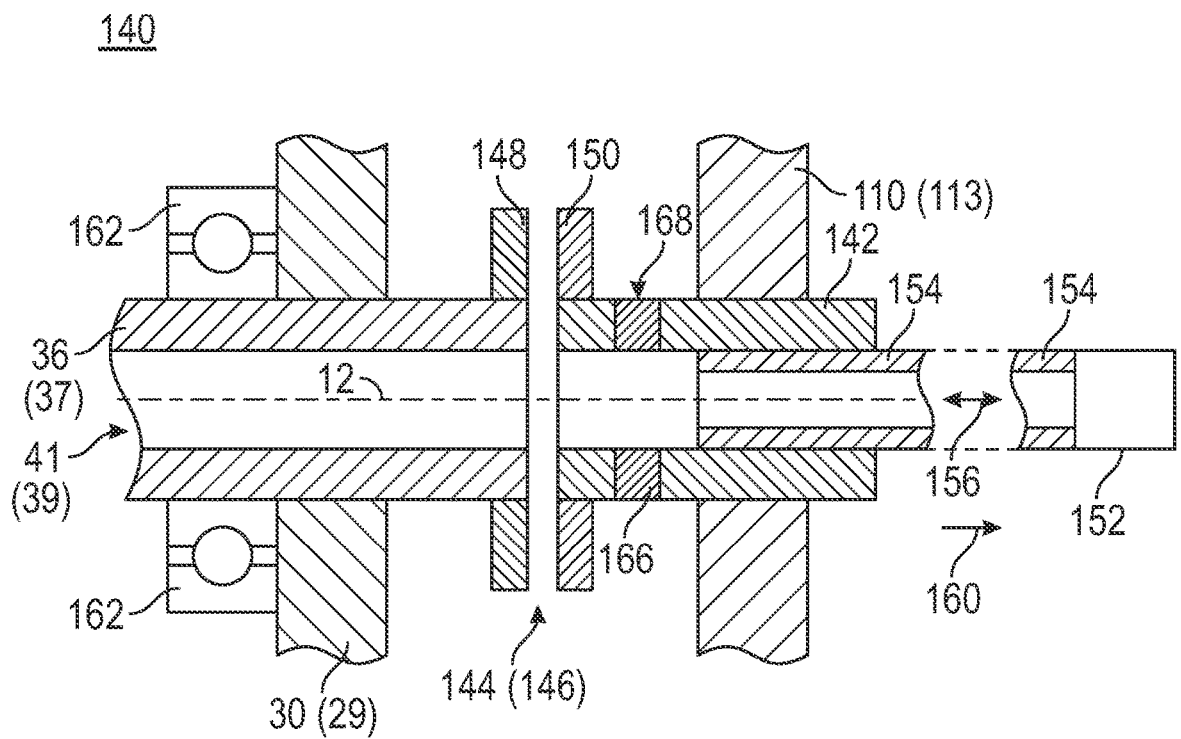
FIG. 7 depicts an alternate cross-sectional view of the arrangement of FIG. 6, with the first steam turbine being disconnected from the low-pressure spool, according to an aspect of the present disclosure.

FIG. 7 depicts an alternate cross-sectional view of the arrangement of FIG. 6, with the first steam turbine 110 being disconnected from the low-pressure spool 41. As described above for the FIG. 6 embodiment, the actuator 152 actuates the actuator shaft 154 in the first axial direction 158. In FIG. 7, the actuator 152 actuates the actuator shaft 154 and the steam turbine shaft 142 in a second axial direction 160 to decouple the second clutch plate 150 from the first clutch plate 148. The decoupling can be performed when the first steam turbine 110 is not operational (i.e., when the steam 114 is not being provided to the first steam turbine 110).

Returning to the embodiment of FIG. 6, the steam turbine shaft 142 may also include a dynamic isolation mechanism 166. The dynamic isolation mechanism 166 may be, for example, a flex joint 168. The purpose of the dynamic isolation mechanism 166 is to isolate the steam turbine shaft 142 from the low-pressure shaft 36 in a case when an adverse modal (frequency) imbalance may occur between the low-pressure shaft 36 and the steam turbine shaft 142 due to the coupling of the steam turbine shaft 142 with the low-pressure shaft 36. In addition, in the case when the modal imbalance may occur, the actuator 152 may actuate the actuator shaft 154 in the second axial direction 160 to decouple the second clutch plate 150 from the first clutch plate 148, which decouples the first steam turbine 110 from the low-pressure spool 41.

While the foregoing description of FIG. 6 and FIG. 7 relates to the coupling of the first steam turbine 110 to the low-pressure spool 41, the description is equally applicable to the coupling of the second steam turbine 113 to the intermediate-pressure spool 39 for the FIG. 3 embodiment. With regard to the coupling/decoupling of the second steam turbine 113 in the FIG. 4 and FIG. 5 embodiments, a clutch device similar to the clutch device 146 shown in FIG. 6 could be implemented within the gearbox 132, and a dynamic isolation mechanism similar to the dynamic isolation mechanism 166 of FIG. 6 could be implemented within, for example, the driveshaft 134 or the driveshaft 135. Further, while not shown in FIG. 6 or FIG. 7, a similar coupling/decoupling can be implemented in the FIG. 4 embodiment and in the FIG. 5 embodiment between the second steam turbine 113 and the gearbox 132 to couple the steam turbine shaft 142 to the gearbox 132, and to decouple the second stream turbine 113 from the gearbox 132. In this case, the low-pressure shaft 36 shown in FIG. 6 and FIG. 7 would instead correspond to a gearbox shaft that drives the gearbox 132, and that is coupled and decoupled with the steam turbine shaft 142 that is connected to the second steam turbine 113.

Figure 8:
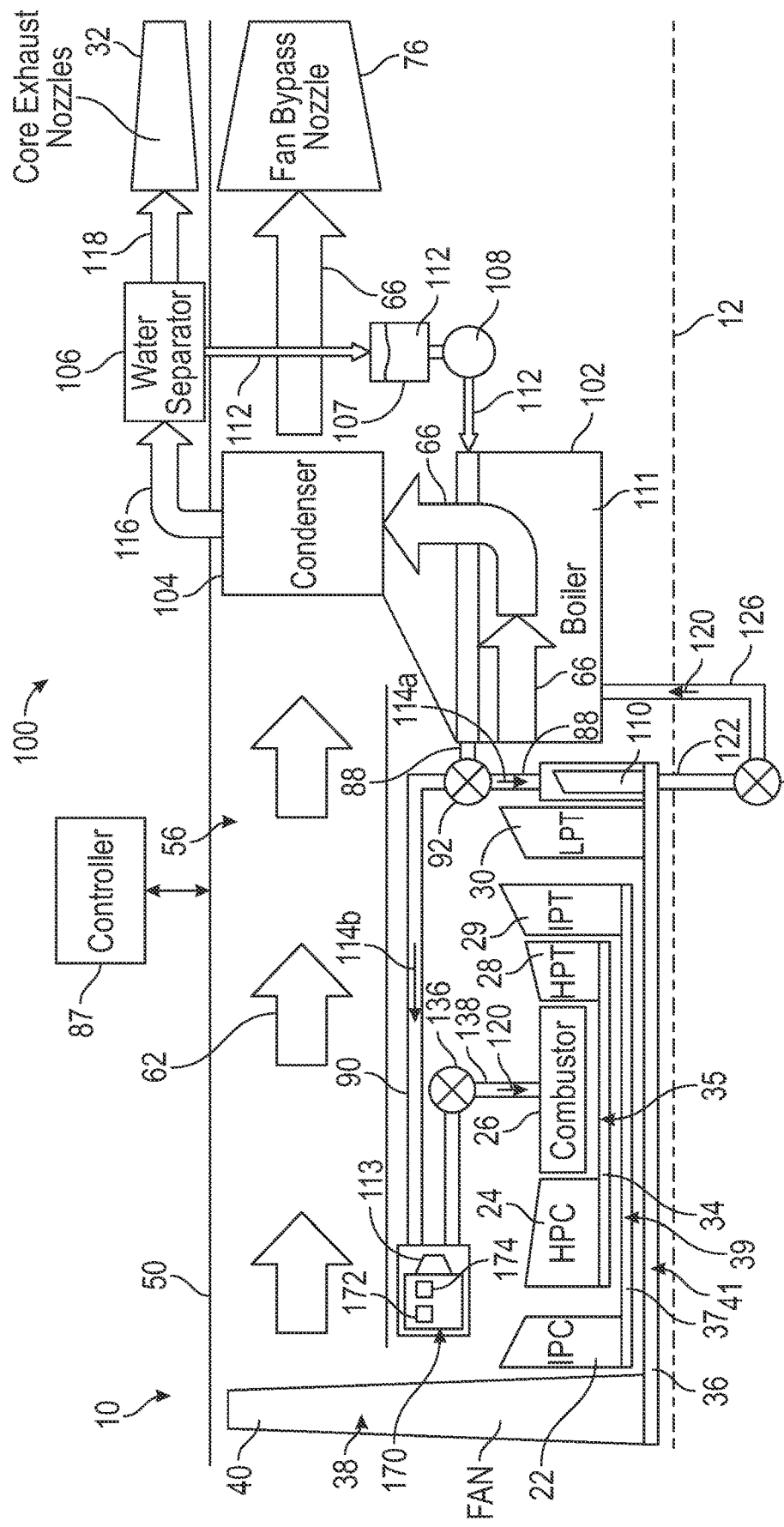
FIG. 8 is a schematic diagram of an aircraft gas turbine engine and the steam generating system similar to the FIG. 4 aspect, according to another aspect of the present disclosure.

FIG. 8 is a schematic diagram of an aircraft gas turbine engine and the steam generating system similar to the FIG. 4 embodiment, according to another embodiment of the present disclosure. In FIG. 8, elements that are the same as those shown and described above for FIG. 4 include the same reference numbers and the description thereof provided above is equally applicable to FIG. 8 and is not described again herein. In the FIG. 8 embodiment, the first steam turbine 110 is connected to the low-pressure shaft 36 and receives the first flow of the steam 114a from the steam supply control valve 92 in the same manner described above for the FIG. 4 embodiment. In the FIG. 8 embodiment, in contrast to the FIG. 4 embodiment, the second steam turbine 113 is arranged to drive a hybrid-electric drive system 170 rather than being arranged to drive the gearbox 132. The hybrid-electric drive system 170 may include, for example, a generator 172 (shown schematically) and an electric motor 174 (also shown schematically). The second steam turbine 113, when supplied with the second flow of the steam 114*b* via the steam supply control valve 92, drives the generator 172 to generate electricity that can be provided to drive the electric motor 174, or that can be provided to a battery system (not shown) that provides electric power to drive the electric motor 174. The electric motor 174 can be connected to any one or more of the low-pressure spool 41, the intermediate-pressure spool 39, or the high-pressure spool 35 via a drive shaft (not shown) similar to the driveshaft 134 (FIG. 4) or the driveshaft 135 (FIG. 5) to provide additional power to the respective spool. Alternatively, although not shown in FIG. 8, the electric motor 174 may be arranged to drive a separate spool (not shown, but separate from the low-pressure spool, the intermediate-pressure spool, and the high-pressure spool, and external to the turbo-engine 16) that includes a propulsion device (e.g., a second fan) that provides propulsion to the gas turbine engine 10.

Each of the foregoing embodiments provide a technique to augment the thrust of the turbine engine by incorporating the steam generating system and with the turbo-engine that includes three spools: the low-pressure spool (e.g., the low pressure compressor and the low-pressure turbine that drives the fan), the intermediate-pressure spool (e.g., the intermediate-pressure compressor and the intermediate-pressure turbine), and the high-pressure spool (e.g., the high-pressure compressor and the high-pressure turbine). The first steam turbine that is connected to the low-pressure spool provides additional power to the low-pressure spool, and to the fan, when thrust augmentation is desired. The second steam turbine that is connected to, and that drives, either the intermediate-pressure spool or the high-pressure spool provides additional power within the turbo-engine to help drive either the intermediate-pressure spool or the high-pressure spool. As a result, thrust augmentation can be provided via the multiple steam turbines.

While the foregoing description relates generally to a gas turbine engine, the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A gas turbine engine including a steam generating system that generates steam, and a turbo-engine including a first spool having a fan and a low-pressure turbine, the fan and the low-pressure turbine being drivingly connected together via a low-pressure shaft, a second spool having an intermediate-pressure compressor and an intermediate-pressure turbine, the intermediate-pressure compressor and the intermediate-pressure turbine being drivingly connected together via an intermediate-pressure shaft, and a third spool having a high-pressure compressor and a high-pressure turbine, the high-pressure compressor and the high-pressure turbine being drivingly connected together via a high-pressure shaft, a first steam turbine arranged to receive a flow of the steam from the steam generating system, and arranged to be connected to, and to drive the first spool, and a second steam turbine arranged to receive a flow of the steam from the steam generating system, and arranged to be connected to, and to drive one of the second spool or the third spool.

The gas turbine engine according to the preceding clause, further including a controller that controls the steam generating system to provide a first flow of steam to the first steam turbine, and to provide a second flow of steam to the second steam turbine.

The gas turbine engine according to any preceding clause wherein the controller is a full authority digital engine controller (FADEC).

The gas turbine engine according to any preceding clause, wherein the first steam turbine is connected to a steam turbine shaft, and the steam turbine shaft includes a dynamic isolation mechanism that is arranged to isolate a modal imbalance between the steam turbine shaft and the low-pressure shaft.

The gas turbine engine according to any preceding clause, wherein the second steam turbine is connected to a steam turbine shaft, and the steam turbine shaft includes a dynamic isolation mechanism that is arranged to isolate a modal imbalance between the steam turbine shaft and the intermediate-pressure shaft.

The gas turbine engine according to any preceding clause, wherein the steam generating system includes a steam control valve that provides a first flow of steam to the first steam turbine, and provides a second flow of steam to the second steam turbine as separate flows of steam.

The gas turbine engine according to any preceding clause, wherein, in operation of the gas turbine engine, in a non-high-power operating state of the gas turbine engine, the steam generating system is operated to block the flow of the steam to the first steam turbine and to block the flow of steam to the second steam turbine, and, in a high-power operating state of the gas turbine engine, the steam generating system is operated to provide: (1) a first flow of steam to the first steam turbine, (2) a second flow of steam to the second steam turbine, or (3) the first flow of the steam to the first steam turbine and the second flow of the steam to the second steam turbine.

The gas turbine engine according to any preceding clause, wherein the first spool is a low-pressure spool, the second spool is an intermediate-pressure spool, and the third spool is a high-pressure spool.

The gas turbine engine according to any preceding clause, wherein the second steam turbine is connected to the intermediate-pressure spool.

The gas turbine engine according to any preceding clause, wherein the second steam turbine is connected to the intermediate-pressure spool via a gearbox, the gearbox being connected to the intermediate-pressure spool at the intermediate-pressure compressor.

The gas turbine engine according to any preceding clause, wherein the second steam turbine is connected to the intermediate-pressure spool via a gearbox and a driveshaft, the driveshaft being connected to the intermediate-pressure spool at the intermediate-pressure turbine.

The gas turbine engine according to any preceding clause, wherein the second steam turbine and the first steam turbine are arranged in a serial flow relationship and are in fluid communication with each other.

The gas turbine engine according to any preceding clause, wherein the steam generating system includes a common steam supply line that provides a single flow of steam to both the first steam turbine and to the second steam turbine.

The gas turbine engine according to any preceding clause, wherein the second steam turbine is connected to the high-pressure spool.

The gas turbine engine according to any preceding clause, wherein the second steam turbine is connected to the high-pressure spool via a gearbox and a driveshaft. The gas turbine engine according to any preceding clause, wherein the intermediate-pressure compressor, the high-pressure compressor, the high-pressure turbine, the intermediate-pressure turbine, and the low-pressure turbine are arranged in a serial flow relationship with each other and, together, define a turbo-engine air flow path.

The gas turbine engine according to any preceding clause, wherein the first steam turbine is arranged to receive a first flow of steam outside of the turbo-engine flow path, and the second steam turbine is arranged to receive a second flow of steam outside of the turbo-engine flow path.

The gas turbine engine according to any preceding clause, wherein the low-pressure shaft includes a coupling device for coupling the first steam turbine to the low-pressure shaft, and for decoupling the first steam turbine from the low-pressure shaft.

The gas turbine engine according to any preceding clause, wherein the coupling device comprises a clutch device.

The gas turbine engine according to any preceding clause, wherein at least one of the intermediate-pressure shaft or the high-pressure shaft includes a coupling device for coupling the second steam turbine to the intermediate-pressure shaft, and for decoupling the second steam turbine from the intermediate-pressure shaft.

The gas turbine engine according to any preceding clause, wherein the coupling device comprises a clutch device.

A method of operating a gas turbine engine that includes a steam generating system that generates steam, and a turbo-engine, the turbo-engine including a first spool having a fan and a low-pressure turbine, the fan and the low-pressure turbine being drivingly connected together via a low-pressure shaft, a second spool having an intermediate-pressure compressor and an intermediate-pressure turbine, the intermediate-pressure compressor and the intermediate-pressure turbine being drivingly connected together via an intermediate-pressure shaft, and a third spool having a high-pressure compressor and a high-pressure turbine, the high-pressure compressor and the high-pressure turbine being drivingly connected together via a high-pressure shaft, a first steam turbine arranged to receive a flow of the steam from the steam generating system, and arranged to be connected to, and to drive the first spool, and a second steam turbine arranged to receive a flow of the steam from the steam generating system, and arranged to be connected to, and to drive one of the second spool or the third spool. The method includes operating the gas turbine engine in a first operating state without steam being provided to either the first steam turbine or to the second steam turbine, operating the gas turbine engine in a second operating state with steam being provided by the steam generating system to the first steam turbine and not to the second steam turbine, operating the gas turbine engine in a third operating state with steam being provided by the steam generating system to the second steam turbine and not to the first steam turbine, and operating the gas turbine engine in a fourth operating state with the steam being provided by the steam generating system to the first steam turbine and to the second steam turbine.

The method according to the preceding clause, further including controlling, by a controller, the steam generating system to provide a first flow of steam to the first steam turbine, and to provide a second flow of steam to the second steam turbine.

The method according to any preceding clause wherein the controller is a full authority digital engine controller (FADEC) that controls the gas turbine engine to perform the method.

The method according to any preceding clause, wherein the first steam turbine is connected to a steam turbine shaft, and the steam turbine shaft includes a dynamic isolation mechanism that is arranged to isolate a modal imbalance between the steam turbine shaft and the low-pressure shaft.

The method according to any preceding clause, wherein the second steam turbine is connected to a steam turbine shaft, and the steam turbine shaft includes a dynamic isolation mechanism that is arranged to isolate a modal imbalance between the steam turbine shaft and the intermediate-pressure shaft.

The method according to any preceding clause, wherein the steam generating system includes a steam control valve that provides a first flow of steam to the first steam turbine, and provides a second flow of steam to the second steam turbine as separate flows of steam.

The method according to any preceding clause, wherein, in operation of the gas turbine engine, in a non-high-power operating state of the gas turbine engine, the steam generating system is operated to block the flow of the steam to the first steam turbine and to block the flow of steam to the second steam turbine, and, in a high-power operating state of the gas turbine engine, the steam generating system is operated to provide: (1) a first flow of steam to the first steam turbine, (2) a second flow of steam to the second steam turbine, or (3) the first flow of the steam to the first steam turbine and the second flow of the steam to the second steam turbine.

The method according to any preceding clause, wherein the first spool is a low-pressure spool, the second spool is an intermediate-pressure spool, and the third spool is a high-pressure spool.

The method according to any preceding clause, wherein the second steam turbine is connected to the intermediate-pressure spool.

The method according to any preceding clause, wherein the second steam turbine is connected to the intermediate-pressure spool via a gearbox, the gearbox being connected to the intermediate-pressure spool at the intermediate-pressure compressor.

The method according to any preceding clause, wherein the second steam turbine is connected to the intermediate-pressure spool via a gearbox and a driveshaft, the driveshaft being connected to the intermediate-pressure spool at the intermediate-pressure turbine.

The method according to any preceding clause, wherein the second steam turbine and the first steam turbine are arranged in a serial flow relationship and are in fluid communication with each other.

The method according to any preceding clause, wherein the steam generating system includes a common steam supply line that provides a single flow of steam to both the first steam turbine and to the second steam turbine.

The method according to any preceding clause, wherein the second steam turbine is connected to the high-pressure spool.

The method according to any preceding clause, wherein the second steam turbine is connected to the high-pressure spool via a gearbox and a driveshaft.

The method according to any preceding clause, wherein the intermediate-pressure compressor, the high-pressure compressor, the high-pressure turbine, the intermediate-pressure turbine, and the low-pressure turbine are arranged in a serial flow relationship with each other and, together, define a turbo-engine air flow path.

The method according to any preceding clause, wherein the first steam turbine is arranged to receive a first flow of steam outside of the turbo-engine flow path, and the second steam turbine is arranged to receive a second flow of steam outside of the turbo-engine flow path.

The method according to any preceding clause, wherein the low-pressure shaft includes a coupling device for coupling the first steam turbine to the low-pressure shaft, and for decoupling the first steam turbine from the low-pressure shaft.

The method according to any preceding clause, wherein the coupling device comprises a clutch device.

The method according to any preceding clause, wherein at least one of the intermediate-pressure shaft or the high-pressure shaft includes a coupling device for coupling the second steam turbine to the intermediate-pressure shaft, and for decoupling the second steam turbine from the intermediate-pressure shaft.

The method according to any preceding clause, wherein the coupling device comprises a clutch device.

A gas turbine engine including a steam generating unit configured to generate steam, and a turbo-engine including a first spool means, a second spool means, and a third spool means, a first steam turbine arranged to receive a flow of the steam from the steam generating unit, and arranged to be connected to, and to drive the first spool, and a second steam turbine arranged to receive a flow of the steam from the steam generating system, and arranged to be connected to, and to drive one of the second spool or the third spool.

The gas turbine engine according to the preceding clause, wherein the first spool means is a low pressure spool, the second spool means is an intermediate pressure spool, and the third spool means is a high pressure spool.

The gas turbine engine according to any preceding clause, wherein the low pressure spool includes a low pressure compressor and a low pressure turbine drivingly connected to the low pressure compressor.

The gas turbine engine according to any preceding clause, wherein the intermediate pressure spool includes an intermediate pressure compressor and an intermediate pressure turbine drivingly connected to the intermediate pressure compressor.

The gas turbine engine according to any preceding clause, wherein the high pressure spool includes a high pressure compressor and a high pressure turbine drivingly connected to the high pressure compressor.

The gas turbine engine according to the preceding clause, further including a control means configured to control the steam generating unit to provide a first flow of steam to the first steam turbine, and to provide a second flow of steam to the second steam turbine.

The gas turbine engine according to any preceding clause wherein the control means is a full authority digital engine controller (FADEC).

The gas turbine engine according to any preceding clause, wherein the first steam turbine is connected to a steam turbine shaft, and the steam turbine shaft includes a dynamic isolation means that is configured to isolate a modal imbalance between the steam turbine shaft and a low-pressure shaft of the low pressure spool.

The gas turbine engine according to any preceding clause, wherein the second steam turbine is connected to a steam turbine shaft, and the steam turbine shaft includes a dynamic isolation means that is configured to isolate a modal imbalance between the steam turbine shaft and an intermediate-pressure shaft of the intermediate pressure spool.

The gas turbine engine according to any preceding clause, wherein the steam generating unit includes a steam control valve that provides a first flow of steam to the first steam turbine, and provides a second flow of steam to the second steam turbine as separate flows of steam.

The gas turbine engine according to any preceding clause, wherein, in operation of the gas turbine engine, in a non-high-power operating state of the gas turbine engine, the steam generating unit is operated to block the flow of the steam to the first steam turbine and to block the flow of steam to the second steam turbine, and, in a high-power operating state of the gas turbine engine, the steam generating unit is operated to provide: (1) a first flow of steam to the first steam turbine, (2) a second flow of steam to the second steam turbine, or (3) the first flow of the steam to the first steam turbine and the second flow of the steam to the second steam turbine.

The gas turbine engine according to any preceding clause, wherein the second steam turbine is connected to the intermediate-pressure spool.

The gas turbine engine according to any preceding clause, wherein the second steam turbine is connected to the intermediate-pressure spool via a gearbox, the gearbox being connected to the intermediate-pressure spool at the intermediate-pressure compressor.

The gas turbine engine according to any preceding clause, wherein the second steam turbine is connected to the intermediate-pressure spool via a gearbox and a driveshaft, the driveshaft being connected to the intermediate-pressure spool at the intermediate-pressure turbine.

The gas turbine engine according to any preceding clause, wherein the second steam turbine and the first steam turbine are arranged in a serial flow relationship and are in fluid communication with each other.

The gas turbine engine according to any preceding clause, wherein the steam generating system includes a common steam supply line that provides a single flow of steam to both the first steam turbine and to the second steam turbine.

The gas turbine engine according to any preceding clause, wherein the second steam turbine is connected to the high-pressure spool.

The gas turbine engine according to any preceding clause, wherein the second steam turbine is connected to the high-pressure spool via a gearbox and a driveshaft.

The gas turbine engine according to any preceding clause, wherein the intermediate-pressure compressor, the high-pressure compressor, the high-pressure turbine, the intermediate-pressure turbine, and the low-pressure turbine are arranged in a serial flow relationship with each other and, together, define a turbo-engine air flow path.

The gas turbine engine according to any preceding clause, wherein the first steam turbine is arranged to receive a first flow of steam outside of the turbo-engine flow path, and the second steam turbine is arranged to receive a second flow of steam outside of the turbo-engine flow path.

The gas turbine engine according to any preceding clause, wherein the low-pressure shaft includes a coupling device for coupling the first steam turbine to the low-pressure shaft, and for decoupling the first steam turbine from the low-pressure shaft.

The gas turbine engine according to any preceding clause, wherein the coupling device comprises a clutch device.

The gas turbine engine according to any preceding clause, wherein at least one of the intermediate-pressure shaft or the high-pressure shaft includes a coupling device for coupling the second steam turbine to the intermediate-pressure shaft, and for decoupling the second steam turbine from the intermediate-pressure shaft.

The gas turbine engine according to any preceding clause, wherein the coupling device comprises a clutch device.

Although the foregoing description is directed to some exemplary embodiments of the present disclosure, other variations and modifications will be apparent to those skilled in the art, and may be made without departing from the scope of the present disclosure. Moreover, features described in connection with one embodiment of the present disclosure may be used in conjunction with other embodiments, even if not explicitly stated above.

We claim:

1. A gas turbine engine comprising:
   a steam generating system that generates steam; and
   a turbo-engine comprising:
      a first spool having a fan and a low-pressure turbine, the fan and the low-pressure turbine being drivingly connected together via a low-pressure shaft;
      a second spool having an intermediate-pressure compressor and an intermediate-pressure turbine, the intermediate-pressure compressor and the intermediate-pressure turbine being drivingly connected together via an intermediate-pressure shaft; and
      a third spool having a high-pressure compressor and a high-pressure turbine, the high-pressure compressor and the high-pressure turbine being drivingly connected together via a high-pressure shaft;
   a first steam turbine arranged to receive a flow of the steam from the steam generating system, and arranged to be connected to, and to drive the first spool; and
   a second steam turbine arranged to receive a flow of the steam from the steam generating system, and arranged to be connected to, and to drive one of the second spool or the third spool.

2. The gas turbine engine according to claim 1, further comprising a controller that controls the steam generating system to provide a first flow of steam to the first steam turbine, and to provide a second flow of steam to the second steam turbine.

3. The gas turbine engine according to claim 1, wherein the first steam turbine is connected to a steam turbine shaft, and the steam turbine shaft includes a dynamic isolation mechanism that is arranged to isolate a modal imbalance between the steam turbine shaft and the low-pressure shaft.

4. The gas turbine engine according to claim 1, wherein the second steam turbine is connected to a steam turbine shaft, and the steam turbine shaft includes a dynamic isolation mechanism that is arranged to isolate a modal imbalance between the steam turbine shaft and the intermediate-pressure shaft.

5. The gas turbine engine according to claim 1, wherein the steam generating system includes a steam control valve that provides a first flow of steam to the first steam turbine, and provides a second flow of steam to the second steam turbine as separate flows of steam.

6. The gas turbine engine according to claim 1, wherein, in operation of the gas turbine engine, in a non-high-power operating state of the gas turbine engine, the steam generating system is operated to block the flow of the steam to the first steam turbine and to block the flow of steam to the second steam turbine, and, in a high-power operating state of the gas turbine engine, the steam generating system is operated to provide: (1) a first flow of steam to the first steam turbine, (2) a second flow of steam to the second steam turbine, or (3) the first flow of the steam to the first steam turbine and the second flow of the steam to the second steam turbine.

7. The gas turbine engine according to claim 1, wherein the first spool is a low-pressure spool, the second spool is an intermediate-pressure spool, and the third spool is a high-pressure spool.

8. The gas turbine engine according to claim 7, wherein the second steam turbine is connected to the intermediate-pressure spool.

9. The gas turbine engine according to claim 8, wherein the second steam turbine is connected to the intermediate-pressure spool via a gearbox, the gearbox being connected to the intermediate-pressure spool at the intermediate-pressure compressor.

10. The gas turbine engine according to claim 8, wherein the second steam turbine is connected to the intermediate-pressure spool via a gearbox and a driveshaft, the driveshaft being connected to the intermediate-pressure spool at the intermediate-pressure turbine.

11. The gas turbine engine according to claim 1, wherein the second steam turbine and the first steam turbine are arranged in a serial flow relationship and are in fluid communication with each other.

12. The gas turbine engine according to claim 11, wherein the steam generating system includes a common steam supply line that provides a single flow of steam to both the first steam turbine and to the second steam turbine.

13. The gas turbine engine according to claim 7, wherein the second steam turbine is connected to the high-pressure spool.

14. The gas turbine engine according to claim 13, wherein the second steam turbine is connected to the high-pressure spool via a gearbox and a driveshaft.

15. The gas turbine engine according to claim 1, wherein the intermediate-pressure compressor, the high-pressure compressor, the high-pressure turbine, the intermediate-pressure turbine, and the low-pressure turbine are arranged in a serial flow relationship with each other and, together, define a turbo-engine air flow path.

16. The gas turbine engine according to claim 15, wherein the first steam turbine is arranged to receive a first flow of steam outside of the turbo-engine air flow path, and the second steam turbine is arranged to receive a second flow of steam outside of the turbo-engine air flow path.

17. The gas turbine engine according to claim 1, wherein the low-pressure shaft includes a coupling device for coupling the first steam turbine to the low-pressure shaft, and for decoupling the first steam turbine from the low-pressure shaft.

18. The gas turbine engine according to claim 17, wherein the coupling device a clutch device.

19. The gas turbine engine according to claim 1, wherein at least one of the intermediate-pressure shaft or the high-pressure shaft includes a coupling device for coupling the second steam turbine to the intermediate-pressure shaft, and for decoupling the second steam turbine from the intermediate-pressure shaft.

20. The gas turbine engine according to claim 19, wherein the coupling device comprises a clutch device.

* * * * *